(12) United States Patent
Haldar

(10) Patent No.: US 7,636,750 B2
(45) Date of Patent: Dec. 22, 2009

(54) METHOD AND SYSTEM FOR CONTROLLING SCOPE OF USER PARTICIPATION IN A COMMUNICATION SESSION

(75) Inventor: Debashis Haldar, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 1015 days.

(21) Appl. No.: 10/000,855

(22) Filed: Oct. 24, 2001

(65) Prior Publication Data

US 2003/0182374 A1    Sep. 25, 2003

(51) Int. Cl.
*G06F 15/16* (2006.01)
*G06F 3/00* (2006.01)

(52) U.S. Cl. ...................... 709/204; 715/753
(58) Field of Classification Search ................. 709/204; 715/758, 753–759; 455/416
See application file for complete search history.

(56) References Cited

U.S. PATENT DOCUMENTS

| | | | |
|---|---|---|---|
| 4,870,408 A | 9/1989 | Zdunek et al. | |
| 5,426,510 A | 6/1995 | Meredith | |
| 5,442,809 A | 8/1995 | Diaz et al. | |
| 5,568,511 A | 10/1996 | Lampe | |
| 5,617,539 A * | 4/1997 | Ludwig et al. | 709/205 |
| 5,710,591 A | 1/1998 | Bruno et al. | |
| 5,818,836 A | 10/1998 | DuVal | |
| 5,850,611 A | 12/1998 | Krebs | |
| 5,884,196 A | 3/1999 | Lekven et al. | |
| 5,936,964 A | 8/1999 | Valko et al. | |
| 5,983,099 A | 11/1999 | Yao et al. | |
| 5,995,827 A * | 11/1999 | Gitlin et al. | 455/416 |
| 6,014,556 A | 1/2000 | Bhatia et al. | |
| 6,032,051 A | 2/2000 | Hall et al. | |
| 6,119,017 A | 9/2000 | Cassidy et al. | |
| 6,161,137 A * | 12/2000 | Ogdon et al. | 709/224 |
| 6,178,323 B1 | 1/2001 | Nagata | |
| 6,236,854 B1 * | 5/2001 | Bradshaw, Jr. | 455/416 |
| 6,349,136 B1 * | 2/2002 | Light et al. | 379/202.01 |
| 6,363,411 B1 | 3/2002 | Dugan et al. | |
| 6,381,467 B1 | 4/2002 | Hill et al. | |

(Continued)

FOREIGN PATENT DOCUMENTS

EP    0 817 457 A2    1/1998

(Continued)

OTHER PUBLICATIONS

A. Cellatoglu, S.T. Worrall, S.N. Fabri, A.M. Kondoz, and A.H. Sadka, "Performance of RTP/UDP/IP header compression in cellular networks", Sep. 2000, London Communications Symposium, University College London.*

(Continued)

*Primary Examiner*—Aaron Strange

(57) ABSTRACT

A method and system for controlling the scope of user participation in an ongoing communication session. A communication controller receives a predefined control signal, such as from one of the conference participants, during the ongoing session. The control signal indicates a request to change the scope of participation of at least one user in the session. In response, the server changes the scope of participation of at least one user, while retaining participation of that user in the session. For instance, the request may be to switch one of the users to a listen-only mode, and the server may respond accordingly.

25 Claims, 8 Drawing Sheets

U.S. PATENT DOCUMENTS

| | | | |
|---|---|---|---|
| 6,404,873 B1 | 6/2002 | Beyda et al. | |
| 6,490,452 B1 | 12/2002 | Boscovic et al. | |
| 6,526,377 B1 | 2/2003 | Bubb | |
| 6,598,075 B1* | 7/2003 | Ogdon et al. | 709/204 |
| 6,622,016 B1 | 9/2003 | Sladek et al. | |
| 6,662,211 B1* | 12/2003 | Weller | 709/204 |
| 6,697,858 B1 | 2/2004 | Ezerzer et al. | |
| 6,731,609 B1 | 5/2004 | Hirni et al. | |
| 6,785,379 B1 | 8/2004 | Rogers et al. | |
| 6,876,734 B1* | 4/2005 | Summers et al. | 379/202.01 |
| 2002/0055364 A1 | 5/2002 | Wang et al. | |
| 2002/0071445 A1 | 6/2002 | Wu et al. | |
| 2002/0145990 A1 | 10/2002 | Sayeedi | |
| 2002/0147818 A1 | 10/2002 | Wengrovitz | |
| 2002/0172165 A1 | 11/2002 | Rosen et al. | |
| 2002/0172169 A1 | 11/2002 | Rosen et al. | |
| 2002/0173325 A1 | 11/2002 | Rosen et al. | |
| 2002/0173326 A1 | 11/2002 | Rosen et al. | |
| 2002/0173327 A1 | 11/2002 | Rosen et al. | |
| 2002/0177461 A1 | 11/2002 | Rosen et al. | |
| 2002/0191583 A1 | 12/2002 | Harris et al. | |
| 2002/0191635 A1* | 12/2002 | Chow et al. | 370/463 |
| 2003/0008657 A1 | 1/2003 | Rosen et al. | |
| 2003/0021264 A1 | 1/2003 | Zhakov et al. | |
| 2003/0114156 A1 | 6/2003 | Kinnavy | |

FOREIGN PATENT DOCUMENTS

| | | |
|---|---|---|
| EP | 0 984 608 A2 | 3/2000 |

OTHER PUBLICATIONS

A. Cellatoglu, S. Fabri, S. Worrall, A. Sadka and A. Kondoz, "Robust Header Compression for Real-Time Services in Cellular Networks", Mar. 2001, In Proc. of 2nd Int. Conf. on 3G Mobile Communication Technologies, pp. 124-128.*

C. Bettstetter, H. Vogel and J. Eberspacher, GSM Phase 2+ General Packet Radio Service GPRS: Architecture, Protocols, and Air Interface, 1999, IEEE Communications Surveys, vol. 2. No. 3, pp. 2-14.*

H. Schulzrinne et al., "RTP: A Transport Protocol for Real Time Applications", Jan. 1996, RFC 1889, pp. 15-16.*

International Search Report from International Application No. PCT/US02/31411, dated Mar. 4, 2003.

International Search Report from International Application No. PCT/US02/36055, dated Apr. 10, 2003.

International Search Report from International Application No. PCT/US03/03021, dated Jun. 18, 2003.

U.S. Appl. No. 10/277,465, filed Oct. 22, 2002 entitled "Method for Call Setup Using Short Data Bursts".

3rd Generation Partnership Project 2 "3GPP2", Fast Call Set-Up, Version 1.0, Apr. 15, 2002.

Mobile Tornado, http://www.mobiletornado.com/products_iprsptt.html, printed from the World Wide Web on Jan. 27, 2003.

"Qualcomm Chats Up 'Push-to-Talk'," http://siliconvalley.internet.com/news/print.php/953261, printed from the World Wide Web on Jan. 27, 2003.

Schulzrinne and Rosenberg, "SIP Caller Preferences and Callee Capabilities," Internet Engineering Task Force, Internet Draft, Oct. 22, 1999.

Vakil et al., "Host Mobility Management Protocol Extending SIP to 3G-IP Networks," Internet Engineering Task Force, Internet Draft, Oct. 1999.

Campbell and Sparks, "Control of Service Context Using SIP Request—URI," Network Working Group, Apr. 2001.

Ericsson, www.telecomcorridor.com/wireless%20horizons/1Coyne.pdf, printed from the World Wide Web on Jun. 27, 2001.

Dirk Kutscher/Jorg Ott, "The Message Bus—A Communication & Integration Infrastructure for Component-Based Systems," White Paper, Jan. 2000.

Ott et al., "A Message Bus for Local Coordination," Network Working Group, Internet-Draft, May 30, 2001.

TR45, Medium Access Control (MAC) Standard for cdma2000 Spread Spectrum Systesm, IS-2000-3, Jul. 12, 1999.

3rd Generation Partnership Project 2 '3GPP2', "Interoperability Specification (IOS) for CDMA 2000 Access Network Interfaces—Part 3 Features," Nov. 2001.

Perkins, "IP Mobility Support," Internet Engineering Task Force Request for Comment 2002, Oct. 1996.

Perkins, "IP Encapsulation within IP," Internet Engineering Task force Request for Comments 2003, Oct. 1996.

Perkins, "Minimal Encapsulation with in IP," Internet Engineering Task Force Request for Comments 2004, Oct. 1996.

Solomon, "Applicability Statement for IP Mobility Support," Internet Engineering Task Force Request for Comments 2005, Oct. 1996.

Handley et al., "SDP: Session Description Protocol," Internet Engineering Task Force Request for Comment 2327, Apr. 1998.

Handley et al., "SIP: Session Initiation Protocol," Internet Engineering Task Force Request for Comment 2543, Mar. 1999.

Fielding et al., "Hypertext Transfer Protocol—HTTP/1.1," Internet Engineering Task force Request for Comment 2616, Jun. 1999.

Rigney et al., "Remote Authetication Dial in User Service (RADIUS)," Internet Engineering Task Force Request for Comment 2865, Jun. 2000.

Rigney, "RADIUS Accounting," Internet Engineering Task Force Request for Comment 2866, Jun. 2000.

OMA, Discussion and definitions on PoC Floor Control, Input Contribution, Doc 190 OMA-REQ-2003-0375-PoC_Floor_Control, Jun. 2, 2003.

OMA, "PoC Use case: Mobile—PC Example," Input Contribution, Doc #OMA-REQ-2003-0323 PoC Mobile-PC use case, May 5, 2003.

OMA, "PoC Use case: Multimedia Group Call Example," Input Contribution, Doc #OMA-REQ-2003-0306-PoC UseCase-group-multimedia-scenario, May 6, 2003.

OMA, "PoC Use case: Examples of User Requirements," Input Contribution, Doc #OMA-REQ-2003-0305-PoC Use Case, May 6, 2003.

OMA, "Inputs for PoC Requirements Document," Input Contribution, Doc #OMA-REQ-2003-0367-PoC_Input_Motorola, May 29, 2003.

OMA, "Push to Talk over Cellular (PoC)," Version: 0.1.6, May 12, 2003.

International Preliminary Examination Report from International Application No. PCT/02/29575, dated Dec. 27, 2003.

International Search Report from International Application No. PCT/US2003/02950, dated Jan. 30, 2003.

Office Action from U.S. Appl. No. 10/067,080, dated May 21, 2003.

Office Action from U.S. Appl. No. 10/067,080, dated Apr. 27, 2004.

U.S. Appl. No. 09/977,832, filed Oct. 15, 2001, Guanglu Wang et al.

Handley et al., "SDP: Session Description Protocol", RFC:2327, Apr. 1998, pp. 1-42.

International Search Report from International Application No. PCT/US02/29575, dated Nov. 9, 2002.

* cited by examiner

| PARTICIPATION STATE TABLE | |
|---|---|
| STATION | MODE |
| A | ACTIVE |
| B | ACTIVE |
| C | LISTEN-ONLY |
| D | ACTIVE |

FIG. 3

TABLE OF PARTICIPATION CONTROL CODES

| PAYLOAD VALUE | LABEL | ACTION |
|---|---|---|
| 135 | MUTE | SWITCH SENDER TO LISTEN-ONLY MODE |
| 137 | UNMUTE | SWITCH SENDER TO ACTIVE MODE |
| 139 (AND TARGET) | BLOCK | STOP BRIDGING COMMUNICATIONS FROM TARGET TO SENDER |
| 141 (AND TARGET) | UNBLOCK | START BRIDGING COMMUNICATIONS FROM TARGET TO SENDER |
| 143 (AND OTHER STATION(S)) | PRIVATE | ESTABLISH A SUB-SESSION BETWEEN SENDER AND OTHER DESIGNATED STATION(S) |

FIG. 4

METHOD AND SYSTEM FOR CONTROLLING SCOPE OF USER PARTICIPATION IN A COMMUNICATION SESSION

BACKGROUND

1. Field of the Invention

The present invention is directed to a method and system for controlling scope of user participation in an ongoing communication session. The techniques described here can extend to use with respect to various types of communication sessions, whether circuit-switched or packet-switched.

2. Description of Related Art

As a general matter, it is known to establish a conference session over a telecommunications network between multiple user stations, each operated by a respective user. An multipoint control unit (MCU) can reside in the telecommunications network and can function as a bridging or switching device between the participating stations, to support the conference session.

A participating station can initiate the conference session by sending a session setup message to the MCU, identifying the other desired participant(s). The MCU may then seek to connect with the designated other participants, such as by forwarding the session setup message to each other party. Upon successful setup of the session, the MCU may then establish a communication session respectively with each participating station, and the MCU may bridge together the communication sessions, so that the users at the stations can confer with each other via the MCU.

By way of example, consider two users, A and B, operating respective user stations. A wishes to engage in a conference session with B and therefore instructs his user station to initiate the conference. A's user station may then responsively execute a session initiation protocol (SIP) client application to generate and send a SIP INVITE message to the MCU, seeking to invite B to the conference session. The MCU will then treat that INVITE message as a request to establish a conference session with B. To establish the conference session, the MCU may send another INVITE to B's station, seeking to set up a session with B.

Upon receipt of the INVITE from the MCU, B's station may execute a SIP client application to accept the invitation, by sending a SIP 200 OKAY message back to the MCU. Upon receipt of the 200 OKAY, the MCU would then send a 200 OKAY to A's station. In turn, A's station would send a SIP ACKNOWLEDGEMENT to the MCU, and the MCU would send an ACKNOWLEDGEMENT to B's station. As a result, two communication sessions or "legs" will have been initiated, one between A's station and the MCU, and another between the MCU and B's station.

Once these legs have been initiated, the two stations may then begin communicating with the MCU via respective real time protocol (RTP) sessions. Client A's station would communicate with the MCU via one RTP session, and client B's station would communicate with the MCU via another RTP session. The MCU would then bridge together the two sessions, thereby allowing A and B to communicate with each other. A real-time control protocol (RTCP) could be used to manage each session and to tear down the sessions when they are finished.

SUMMARY

According to an exemplary embodiment of the invention, a mechanism is provided for controlling the scope of user participation during an ongoing communication session (i.e., between the times that the session is set up and torn down). As a general matter, a central communication server (e.g., a conference server) will receive a control signal during the ongoing session and will respond to the control signal by changing the scope of at least one user's participation in the session, while retaining the user's participation in the session. Thus, the server will effectively switch the user from one mode of participation to another.

For example, the server may receive from one of the participants in the session a control code that indicates a request to switch the participant from an active (bi-directional) mode of participation in the session to a listen-only mode of participation in the session, and vice versa. And the server may respond to the control code by blocking communications from being transmitted from the requesting participant to one or more other participants in the session, while still allowing communications to be transmitted to the requesting participant from one or more other participants in the session.

As another example, given a group of participants in the session, the server may receive a control code that indicates a request to establish a private session of a subset of those participants, i.e., a sub-session within the session. In response, the server may allow that subset of participants to communicate with each other in a sub-session, while preventing their communications from being transmitted to one or more other participants in the session. (The other(s) may be put on "hold" or may engage continue communicating during this period.) In turn, the server may receive a restore code that indicates a request to restore the full session. And, in response, the server may then restore the full session between the group of participants. Many other examples are possible as well.

These as well as other aspects and advantages of the present invention will become apparent to those of ordinary skill in the art by reading the following detailed description, with appropriate reference to the accompanying drawings.

BRIEF DESCRIPTION OF THE DRAWINGS

An exemplary embodiment of the present invention is described herein with reference to the drawings, in which:

FIG. 3 is a table depicting participation modes of various session participants;

FIG. 4 is a logic table defining control codes and associated changes in scope of user participation;

DETAILED DESCRIPTION OF AN EXEMPLARY EMBODIMENT

Figure 1:
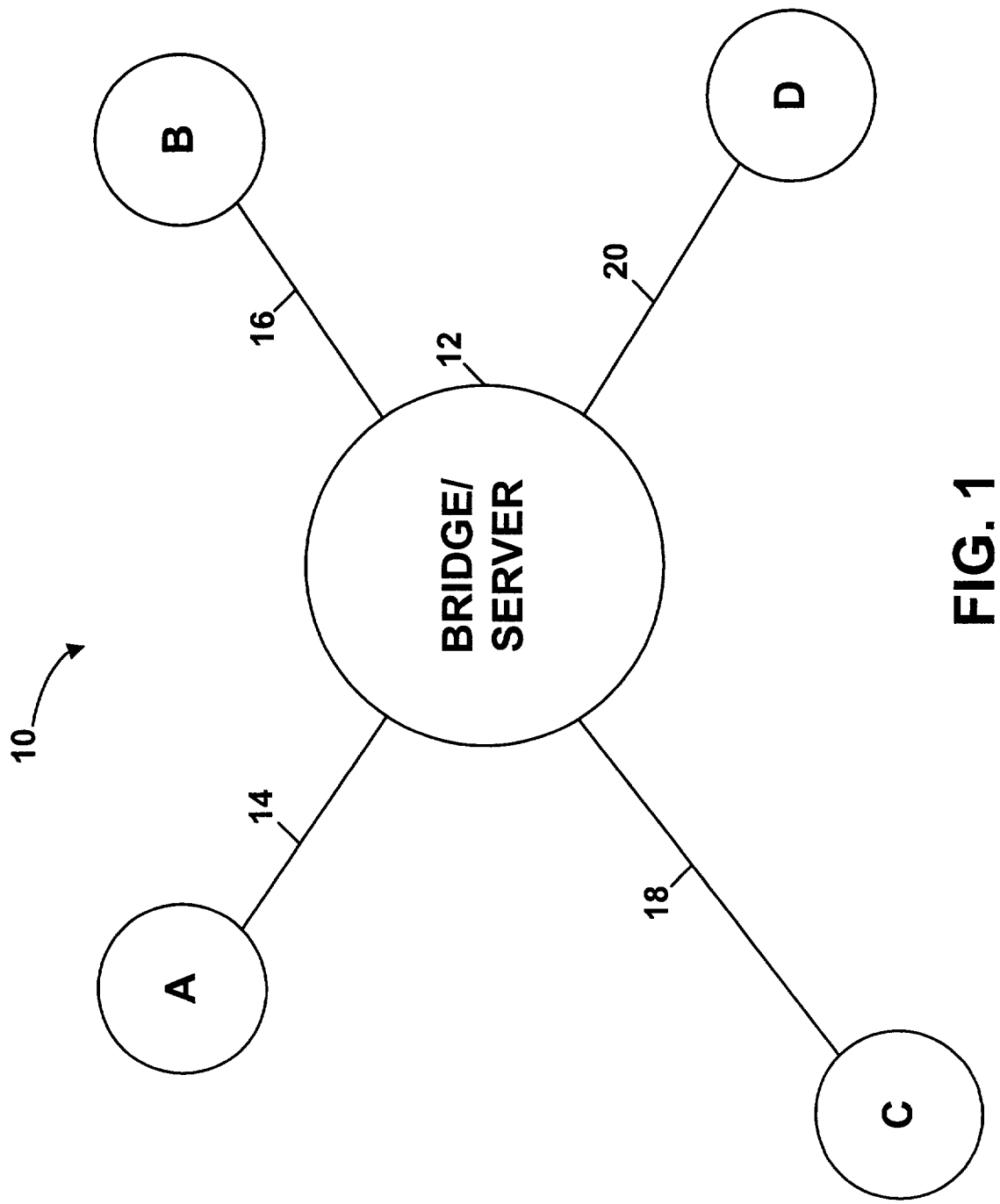
FIG. 1 is a block diagram of a communication system in which the exemplary embodiment can be employed.

Referring to the drawings, FIG. 1 illustrates a simplified block diagram of a communication system 10 in which an exemplary embodiment of the present invention can be employed. System 10 includes at its core a conference bridge or other central communication server 12, which is arranged to bridge together communications between a number of user stations or client stations. FIG. 1 depicts four exemplary client stations, A, B, C and D. However, server 12 may support communication between more or fewer client stations at a time.

With the arrangement shown in FIG. 1, the server might engage in bi-directional communication respectively with each of the client stations, and the server may then bridge together those communications so as to allow users at the stations to communicate with each other. As shown, for instance, the server may communicate with station A via a link 14, the server may communicate with station B via a link 16, the server may communicate with station C via a link 18, and the server may communicate with station D via a link 20.

Each of these communication links may take various forms. As examples, one or more of the links may include a wireless component such as a radio frequency (RF), microwave, satellite or other such link. As another example, one or more of the links may include a landline component, such as an Ethernet, twisted pair, coaxial or other such link. Other examples are also possible.

Generally, or when in communication with server 12, each of the client stations will preferably have a respective network address and/or other station identifier. The station identifier might depend on the type of link that ties the station to the server. For instance, the station identifier could be an IP address, a telephone number (e.g., a mobile identification number (MIN), or a network address identifier or SIP address that is correlated with the station by a central registry. Other examples are possible as well.

Server 12 may also take various forms. As indicated above, the server preferably functions to bridge communications between client stations A, B, C and D, via links 14, 16, 18 and 20. As such, the server preferably includes ports to send and receive communication signals via these links. Further, the server preferably includes logic to control the bridge between communications on the various links.

Figure 2:
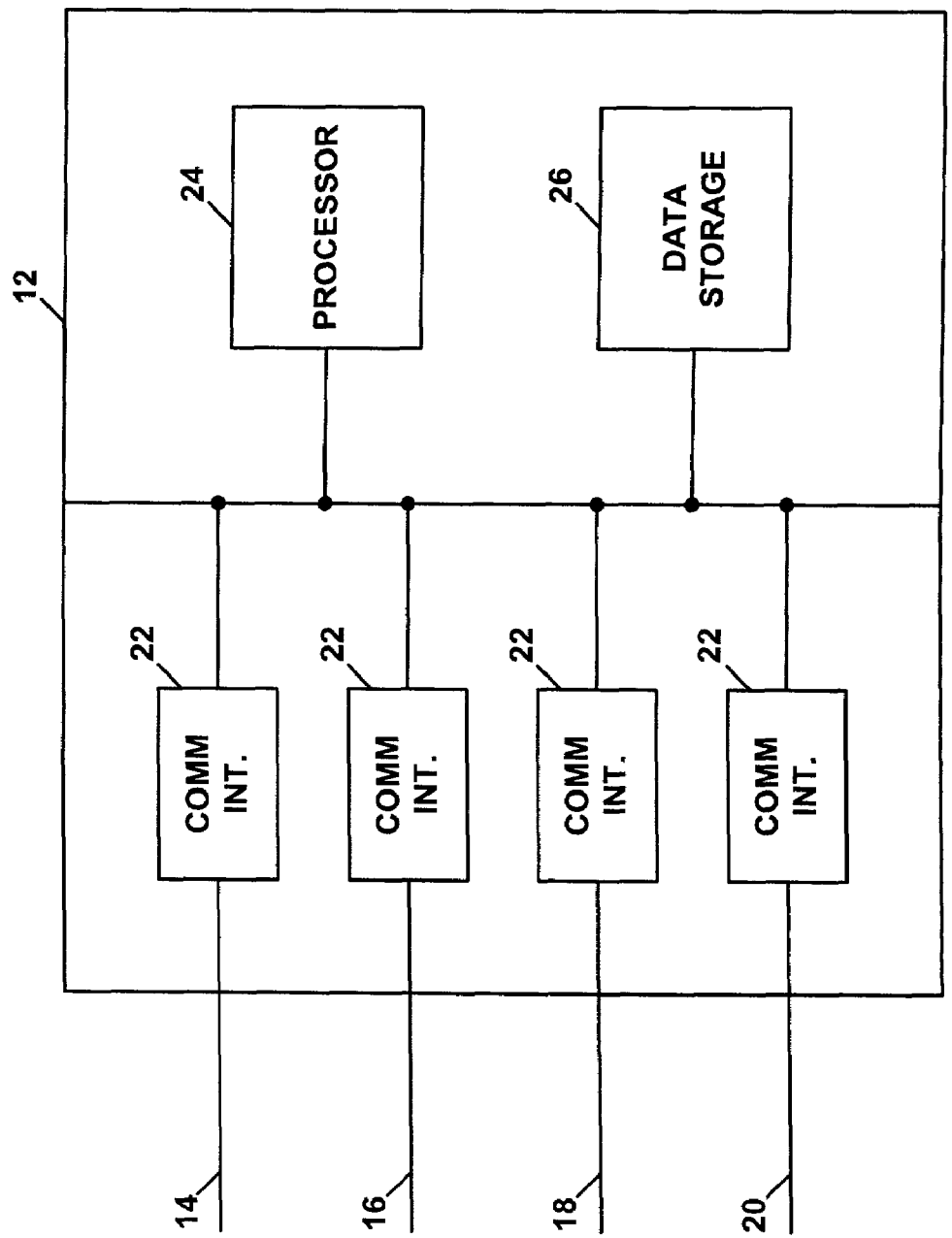
FIG. 2 is a block diagram of an exemplary communication server.

Referring next to FIG. 2, a generalized block diagram of a representative server 12 is shown. As illustrated, exemplary server 12 includes a number of communication interfaces (or ports) 22, a processor 24, and data storage 26, all tied together via a system bus 28.

Communication interfaces 22 are tied respectively to links 14, 16, 18 and 20. The server may thus send and receive communication signals (such as user data and control signals) via these links. The communication interfaces 22 may take various forms (and may vary among each other), depending for instance on the type of links to which they are tied. For example, if the links are RF links, then the interfaces may include an antenna and RF communication circuitry.

Additionally, the server includes a processor 24 and data storage 26. Data storage 26 preferably holds machine language instructions and/or other logic executable by processor 24 to carry out various functions described herein. (Alternatively, some such functions could be carried out by hardware and/or firmware).

For example, data storage 26 may include logic to set up and tear down communications with the various client stations. This logic can vary depending on the type of links and protocols used for communication. By way of example, the logic could be a SIP client application. As such, it could receive an INVITE requests from one of the client stations, which seeks to set up a communication session with the other client stations. In response, it may send INVITE requests of its own to the other client stations and ultimately set up communications respectively between itself and each client station, as described in the background section above. Further, at the end of a bridged session, the SIP client application can function to tear down communications with each client station.

As another example, data storage 26 may include logic to communicate real-time media signals with the client stations. Again, this logic can vary depending on the type of links and protocols that are employed. For instance, the logic might function to communicate according to the UDP/IP (or TCP/IP) and RTP protocols.

Further, data storage 26 preferably includes logic to bridge together communications between the various client stations. Similarly, this logic would vary depending on the type of protocols employed. For instance, assuming each client station communicates signals as UDP/IP packets, the logic might function to depacketize and uncover the underlying signals received from each client station, combine the signals together (or select a strongest signal), and re-packetize and transmit the resulting signal out to the stations. Other examples are possible as well.

In addition, data storage 26 preferably includes logic to control communications between the various client stations. For instance, this logic may take the form of a set of access control rules (e.g., a table of rules) that specify allowed or disallowed bridging of communications between the client stations. For example, an access control rule might specify (or provide by default, without specifying) that, when the server receives real-time media signals from any client station in the group A, B, C and D, the server should transmit those signals to each of the other stations in the group. As another example, an access control rule might specify that when the server receives real-time media signals from client station A, the server should not transmit those signals to other stations in the group (thereby facilitating a "listen-only" mode for station A). In operation, processor 24 may follow these rules, so as to restrict communications accordingly.

The access control logic effectively indicates the state of participation of each client station. In addition, data storage 26 may include a rolled up state-table that processor can use to quickly determine the state of a given client station. FIG. 3 sets forth such a table by way of example. The table of FIG. 3 shows that client stations A, B and D are in an active mode, while client station C is in a listen-only mode.

Still further, data storage 26 preferably includes logic to allow server 12 to receive and respond to predefined control codes that indicate requests to change the scope of user participation during an ongoing communication session. The server will preferably receive those control codes from one of the participating client stations, during the ongoing communication session between the stations. However, the server may alternatively receive such a control code from some other entity during the ongoing session.

The manner in which the server receives a given predefined control code could take various forms. For example, the server could receive the control codes in an RTCP message in the same media channel that is used to carry real-time media signals (i.e., as an "in-band" message). Alternatively or additionally, the server could receive the control codes via some other control channel (i.e., as an "out-of-band" message).

As is known in the art, the RTCP protocol functions to allow a network entity to tear down an RTP session. Further, it functions to allow network entities to control aspects of the transmission channel, such as bandwidth, and other channel characteristics. As such, RTCP defines certain types of control packets, each designated by a respective header field, and each having a respective payload block. One type of control packet is an APPLICATION type.

According to the exemplary embodiment, the server can receive a predefined control code carried as payload in an APPLICATION type RTCP packet. Thus, the server logic may include an RTCP client that functions to receive RTCP packets. Further, the server logic may function to detect an APPLICATION type RTCP packet and to responsively look to the payload block of that packet (e.g., to a predetermined position in the payload block) to find a control code.

The logic may then define certain control codes and corresponding changes in scope of user participation. This correlation may take the form of a table that processor 24 can reference. An exemplary table is shown in FIG. 3. Referring to FIG. 3, five exemplary control codes are defined, a MUTE code, an UNMUTE code, a BLOCK code, an UNBLOCK code and a PRIVATE code. It should be understood that these are specified by way of example only, and other control codes are possible as well.

The table defines the MUTE code to be indicated by the value "135" carried in the payload block of an APPLICATION type packet. The table then indicates that the processor should respond to the MUTE code by switching the sender of the code to a listen-only mode. Thus, when the processor detects the value "135" in the payload block of an APPLICATION type packet sent from client station A, the processor may update the access control rules so as to indicate that (i) communications that the server receives from client station A should not be sent to client stations B, C and D, but (ii) communications that the server receives from any of client stations B, C and D can still be sent to client station A.

Next, the table defines an UNMUTE code to be indicated by the value "137" carried in the payload block of an APPLICATION type packet. The table then indicates that the processor should respond to the UNMUTE code by switching the sender of the code to an active participation mode (assuming the sender was in a listen-only mode—otherwise, the processor may ignore or reject the request). Thus, when the processor detects the value "137" in the payload block of an APPLICATION type packet sent from client station A, the processor may update the access control rules so as to indicate that communications that the server receives from client station A can be sent to client stations B, C and D.

In turn, the table defines a BLOCK code to be indicated by the value "139" (and, optionally, a designation of the participant to be blocked) carried in a predetermined position of the payload block of an APPLICATION type packet. And the table indicates that the processor should respond to the BLOCK code by switching the sender of the code to a transmit-only mode (possibly with respect to a designated other participant), i.e., by blocking communications to the sender from one or more other participating stations. Thus, when the processor receives an APPLICATION type packet from client station A (sender) and detects in the payload block of the packet the value "139" together with a designation of client station B (target), the processor may update the access control rules so as to indicate that the communications that the server receives from client station B should not be sent to client station A.

The table then defines an UNBLOCK code to be indicated by the value "141" (and, again, optionally a designation of the participant to be unblocked) carried in a predetermined position of the payload block of an APPLICATION type packet. And the table indicates that the processor should respond to the UNBLOCK code by switching the sender of the code to an active (bi-directional) mode (possibly with respect to a designated other participant). Thus, when the processor receives an APPLICATION type packet from client station A and detects in the payload block of the packet the value "141" together with a designation of client station B, the processor may update the access control rules so as to indicate that the communications that the server receives from client station B can be sent to client station A.

It should be understood that the predefined control codes employed in the exemplary embodiment can call for a change in scope of participation of a single participant or can call for a change in scope of participation of multiple participants at once. A good example of changing the scope of participation of multiple participants at once might be establishing a sub-session among a subset of participants in a larger session. For example, when stations A, B, C and D are participating in a bridged session, a control code received by the sever might direct the server to establish a sub-session between stations A and B, to the exclusion of stations C and D.

To this end, as further shown in FIG. 4, the table may define a PRIVATE code to be indicated by the value "143" together with a designation of other participants with whom the sender wishes to engage in a private session. (Alternatively, the logic may indicate that a PRIVATE code from a particular station, without a designation of one or more other participants, should be treated as a request to establish a sub-session among the sender and one or more particular other stations of those participating in the current session.)

The table then may then indicate that the processor should respond to the PRIVATE code by maintaining a bridge between the sender and the other designated participant(s), while temporarily blocking communications between them and the other participant(s) in the session. Thus, for instance, when the processor receives an APPLICATION type packet from client station A and detects in the payload block of the packet the value "141" together with a designation of client station B, the processor may update the access control rules so as to indicate that the bi-directional communications should be allowed between stations A and B, but that stations C and D should not be allowed to communicate with stations A and B. Although not shown, the table may then also define a RESTORE control code that station A or B could send so as to restore the larger session between A, B, C and D, ending the sub-session.

Although FIG. 1 depicts server 12 as a single component, it should be understood that the function of the server could in fact be distributed among a number of components. For instance, two servers could be provided and, by establishing communication between the servers, communications between stations served by the respective servers could be bridged. An example of this arrangement is shown in FIG. 5.

Figure 5:
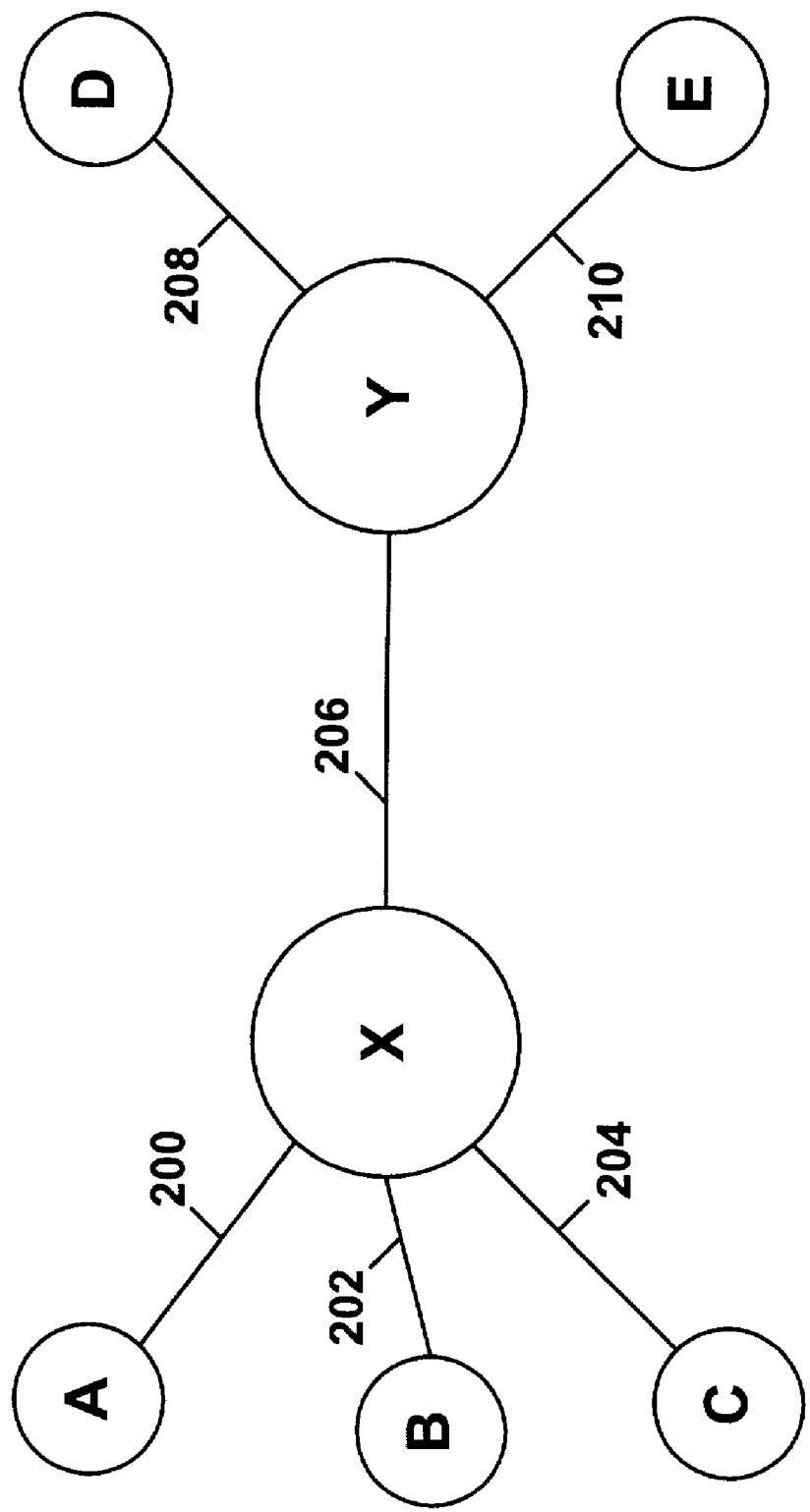
FIG. 5 is another block diagram of a communication system in which the exemplary embodiment can be employed.

Referring to FIG. 5, a first server X is shown serving client stations A, B and C, and a second server Y is shown serving client stations D and E. Server X might sit at one network address, while server Y sits at another network address. It is possible that server X might be owned and operated by company X, while server Y might be owned and operated by company Y. Further, one or more additional communication servers might be interposed between servers X and Y.

Assume now that a user at station A wishes to engage in a conference session with (i) users at stations B, C, D and E. To initiate the conference session, station A may send a setup message to server-X, identifying the requested other participants. In identifying the participants served by server-Y, the setup message may identify server-Y by network address. Alternatively, server-X may have access to a routing table or other data source that points server-X to server-Y for purposes of establishing a session with stations D and E.

Thus, server-X may establish communication legs 200, 202, 204 respectively with users A, B and C and a communication leg 206 with server-Y, and can bridge those legs together. And server-Y may then establish communication legs 208, 210 respectively with stations D and E, and bridge those legs together with leg 206 between server X and server Y. As a result, all of the stations can communicate with each other.

The sub-session mechanism described above can work particularly well in this multiple-server arrangement. For instance, station A may send a PRIVATE control code to server-X, which server-X may be programmed to understand as a request to establish a sub-session between the stations served by server-X (namely, stations A, B and C), to the exclusion of the stations served by server-Y (namely, stations D and E). In response, server-X may block communications with server-Y, thereby blocking communications between (i) stations A, B and C on the one hand and (ii) users D and E on the other, while still maintaining communications among users A, B and C. Many variations are possible as well. (For instance, rather than blocking off users D and E entirely, the server could just block communications from server-X to server-Y, while allowing incoming communications from server-Y to server-X.)

Client stations A, B, C and D, in turn, are each preferably arranged to communicate (send and receive) real-time media signals via their respective links with server 12, and to interface with respective users. As such, each client station preferably includes suitable signal handling logic, a suitable communication interface and a suitable user interface.

Figure 6:
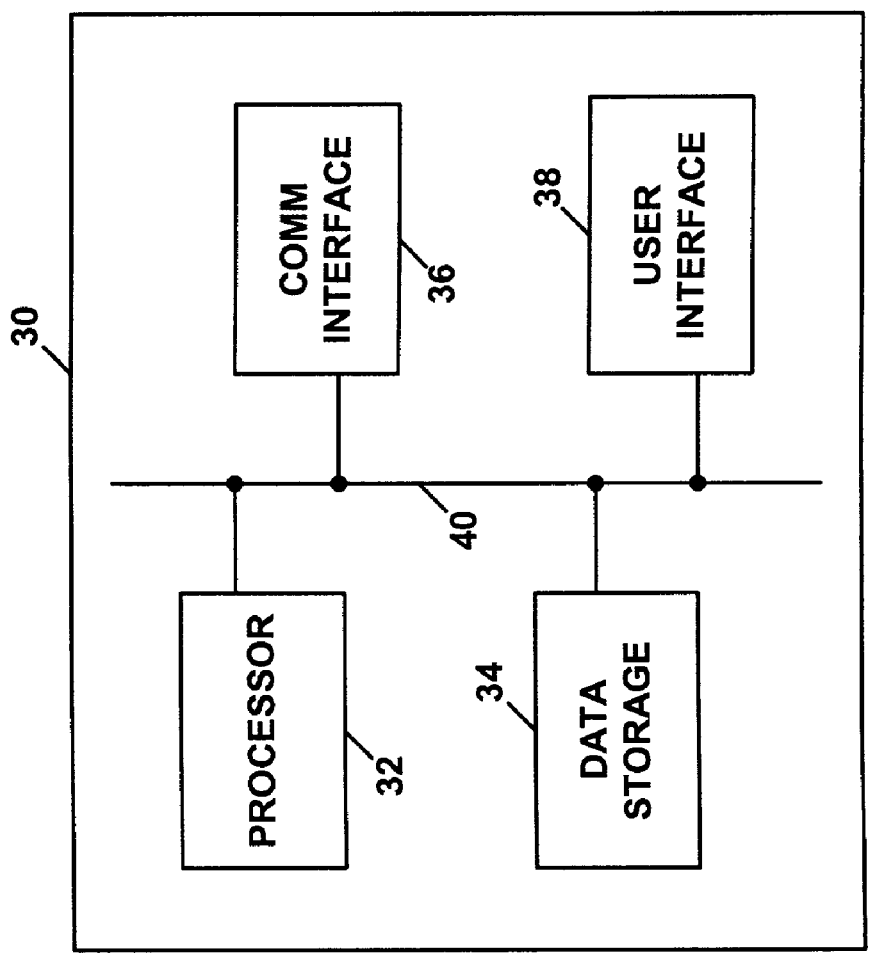
FIG. 6 is a block diagram of an exemplary client station.

Referring next to FIG. 6, for example, a generalized block diagram of a representative client station 30 is shown. Client station 30 includes a processor 32, data storage 34, a communication interface 36 and a user interface 38, all of which may be tied together by a system bus 40.

In the exemplary embodiment, data storage 34 contains machine language instructions that are executable by processor 32 to carry out various functions described herein. (As with the logic in the server, some of these functions could alternatively be embodied in hardware and/or firmware).

For example, data storage 34 may include logic to set up and tear down communications with server 12. This logic can vary depending on the type of link and protocol(s) used for communication. Consistent with the example above, the logic could be a SIP client application. Further, the logic can define a user-selection mechanism, such as a menu graphic or the like, that a user of the station can employ to set up or tear down a communication session. Thus, the logic could be arranged to receive a user request to initiate a bridged communication session with users at designated other stations, and to responsively send out a SIP INVITE request to server 12, seeking to set up the requested session. Ultimately, a leg of the bridged session would then be set up between the station and the server.

As another example, data storage 34 preferably includes logic to interface user communications with the respective communication link to server 12. This interface logic will likely vary depending on the type of communication link and protocols employed, as well as the type of real-time media involved.

For example, if the user speaks, the logic might function to digitize the analog speech signal, to encode the resulting digitized speech signal (using a suitable encoder, such as G.723.1, for instance), and to packetize the encoded signal so as to produce a sequence of RTP packets representing the underlying signal. The processor 32 could then send those packets via the communication link to server 12. Similarly, when the processor receives incoming RTP packets from server 12, the logic might function to depacketize the packets, decode the encapsulated signals, and convert the resulting digital signals into analog signals to be played out to the user of the station.

As yet another example, data storage 34 preferably includes logic to provide predefined control codes to server 12 during an ongoing communication session, so as to request changes in the scope of user participation. This logic can also take various forms, depending on the means of communication between the station and the server. Again consistent with the example described above, the logic may include an RTCP client and may function to insert into an APPLICATION type RTCP packet a predefined control code indicative of a specific request to change the scope of user participation during a communication session.

Further, the logic preferably includes a user-selection mechanism, such as a menu graphic or the like, that a user of the station can employ, during the communication session, to direct the station to send to the server a request to change the scope of user participation. For example, the logic might include an HDML or WML card that processor 32 may cause to be displayed to the user during an ongoing session. The card might provide the user with choices such as MUTE, UNMUTE, BLOCK, UNBLOCK, PRIVATE and RESTORE, in line with the example described above. (Preferably, the station will maintain an indication of its own state and may display only choices that make sense given the current state. For instance, the station might be programmed to display the UNMUTE option only if the server has the station in a mute mode.)

In response to the user selection of the MUTE option, logic underlying the card might then cause processor 32 to insert the associated control code value "135" into the payload block of an APPLICATION type RTCP packet and to then send the packet to server 12. As described above, the server would then adjust the station's mode of participation in the session accordingly.

Communication interface 36, in turn, functions to send and receive user data (e.g., real-time media signals) and control signals (e.g., session participation control signals) over a respective communication link (or links). As such, interface 36 may vary depending on the type of communication link. For example, if the link is an RF wireless link, then interface 36 may include an antenna and may function to send and receive RF signals. Alternatively, if the link is an Ethernet link, then interface 36 might include a packet-network interface.

User interface 38 then functions to interface with a user of the client station. As such, user interface 38 preferably includes equipment for receiving user input, such as a microphone, a video camera, and/or a keypad. Further, the user interface preferably includes equipment for presenting signals to a user, such as a speaker and/or a screen display. Thus, by way of example, the processor may cause to be displayed on the user interface the selection-mechanisms described above. Further, the processor may receive an outgoing speech signal from the user, and may present an incoming speech signal to the user. Other examples are possible as well.

Figure 7:
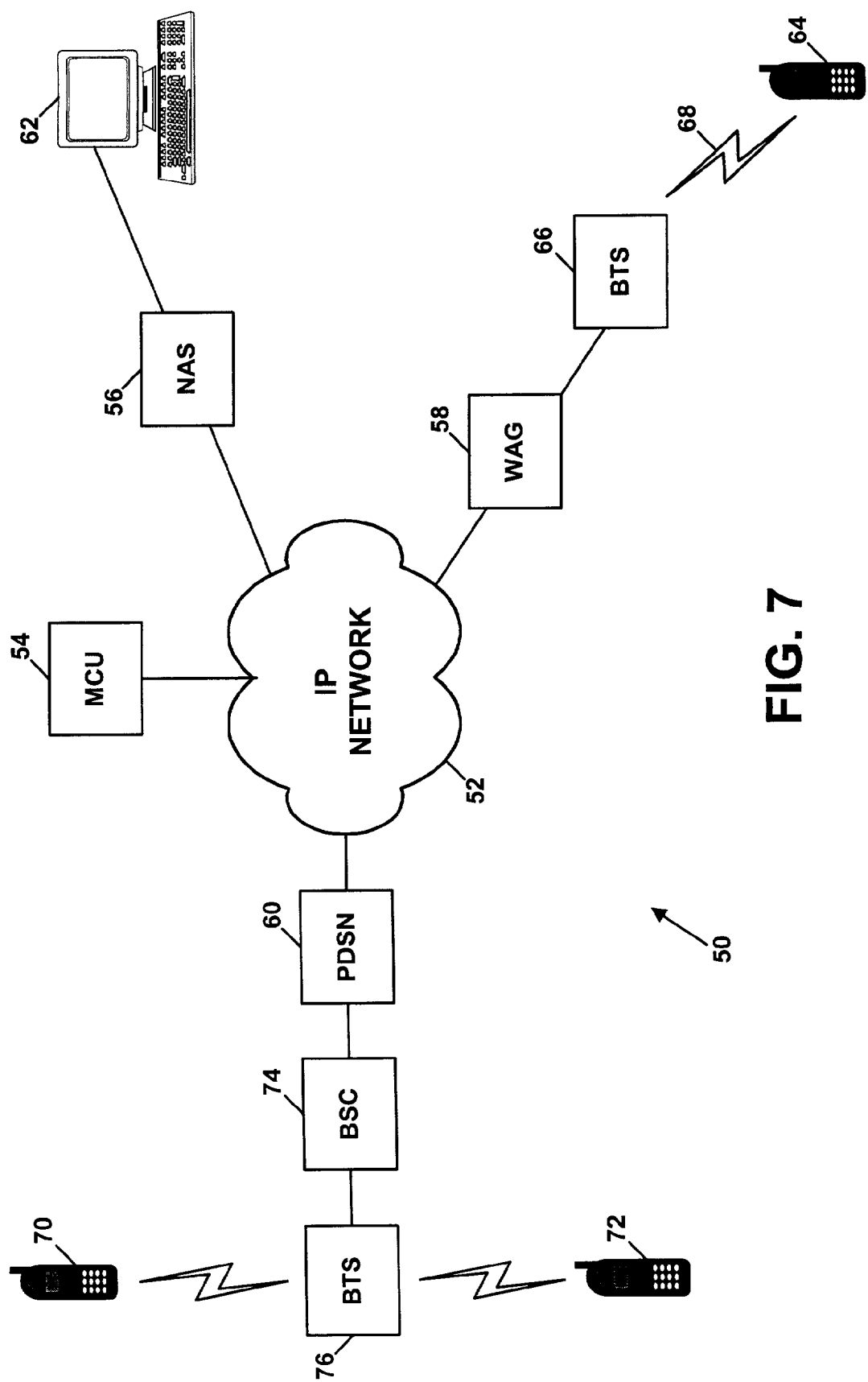
FIG. 7 is a more particular block diagram of a communication system in which the exemplary embodiment can be employed.

System 10 is generally representative of many possible communication systems in which the exemplary embodiment can be employed. As such, the components and links of system 10 can take various forms. Referring next to FIG. 7, for instance, a more specific example of a communication system, designated as system 50, is shown.

As illustrated in FIG. 7, communication system 50 includes an IP network 52, such as the Internet or a private Ethernet for instance. Coupled with (or as nodes on) the IP network are an MCU 54, a network access server (NAS) 56, a wireless access gateway (WAG) 58, and a packet data serving node (PDSN) 60. NAS 56, WAG 58 and PDSN 60 each function to provide IP network connectivity for one or more client stations, so that the client stations can communicate via the IP network with MCU 54 (for instance).

By way of example, NAS 56 is shown connecting a multimedia personal computer 62 to the IP network. As such, computer 62 may engage in packet-based communication with NAS 56 over a suitable link (e.g., a point-to-point protocol (PPP) session over a telephone channel, or a LAN connection), and NAS 56 may route packets between the IP network and the computer. When the computer is coupled with the IP network, it may have an assigned IP address.

In the exemplary embodiment, computer 62 may include a microphone and speakers as well as a voice-over-IP mechanism suitable for communicating speech signals as packet data. By way of example, the computer may include an analog/digital converter, a G.723.1 vocoder, and a packetizer/depacketizer. Thus, when a user is operating the computer, the user can engage in speech communications over the IP network. Further, the computer may include mechanisms for communicating other forms of real-time media signals, such as video for instance.

WAG 58, in turn, is shown providing connectivity for a mobile station (MS) 64, which may be a cellular telephone, personal digital assistant, or other such device. In particular, WAG 58 is linked to a base transceiver station (BTS) 66, which communicates with MS 64 over an air interface 68. Similar to computer 62, MS 64 may be equipped with a mechanism for converting between speech signals and packet data. Packetized speech may then flow via WAG 58, BTS 66 and air interface 68, between MS 64 and the IP network. Thus, when a user is operating the MS, the user can similarly engage in speech communications with other users via the IP network. Further, similar to computer 62, MS 64 may be able to communicate other sorts of real-time media signals as well.

Next, PDSN 60 is shown providing connectivity for mobile stations 70, 72. As such, PDSN 60 is coupled with a base station controller (BSC) 74, which is in turn coupled with a BTS 76. BTS 76 then communicates with mobile stations 70, 72 over respective air interfaces 78, 80. In normal operation, PDSN 60 can conventionally establish a PPP session with each of these mobile stations. In turn, each mobile station may be equipped to convert between speech signals and packet data. Thus, a user operating either mobile station may engage in speech communications with other users via the IP network.

Comparing the exemplary arrangement of FIG. 7 to that shown in FIG. 1, mobile station 70 corresponds with client station A, personal computer 62 corresponds with client station B, mobile station 72 corresponds with client station C, and mobile station 64 corresponds with client station D. In turn, MCU 34 corresponds with server 12. The descriptions above may thus extend by analogy to each of these components.

Figure 8:
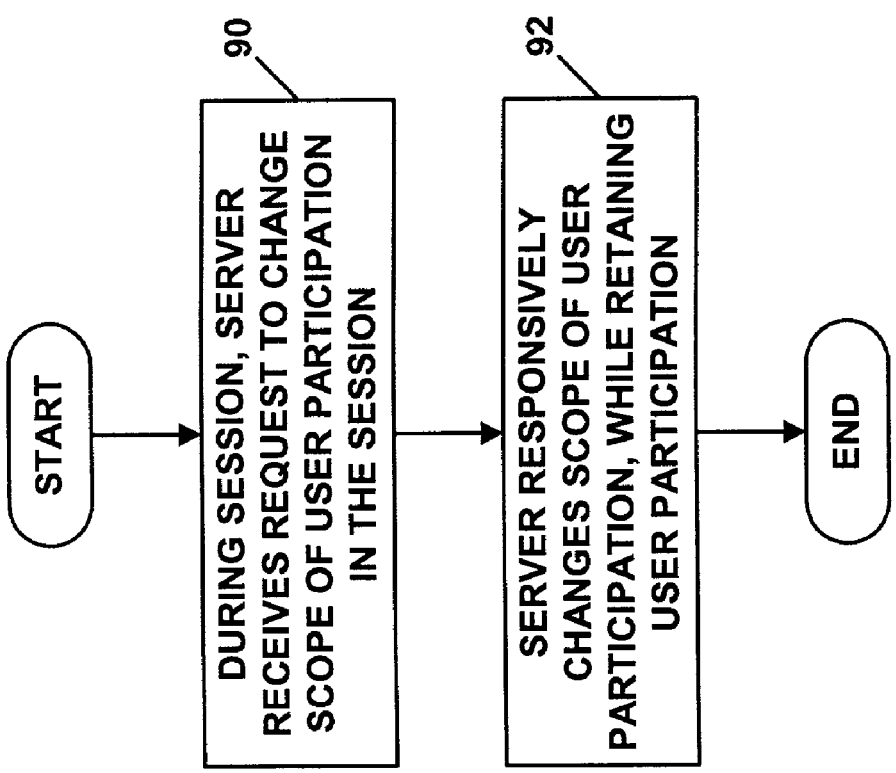
FIG. 8 is a flow chart depicting functions that may be employed in the exemplary embodiment.

Referring next to FIG. 8, a flow chart is provided to illustrate some of the functions that may be carried out in accordance with the exemplary embodiment. In particular, FIG. 8 depicts a method of controlling the scope of user participation during an ongoing session (such as a conference call) in which multiple client stations communicate with each other through a central server, such as server 12 in FIG. 1.

As shown in FIG. 8, at block 90, the server receives a predefined control code during the ongoing session. According to the exemplary embodiment, the predefined control code requests (e.g., is indicative of a request for) a change in scope of user participation in the session. At block 92, the server responds to the control code by changing the scope of participation of at least one of the client stations in the session, while retaining participation of the at least one client station in the session. For instance, the server may switch a client station from an active mode of participation to a listen-only mode of participation. With the switch, the client station would still be participating, albeit in a less than complete mode (a listen-only mode).

As presented in the table at FIG. 4, a MUTE code is defined as a code that switches a sender to listen-only mode. An UNMUTE codes is defined as a code that switches a sender to active mode allowing a participant to listen and to talk. A BLOCK code is defined as a code that stops bridging communications from a target to a sender so that a given client station is permitted to transmit, but not receive, communications. An UNBLOCK code is defined as a code that starts bridging communications from a target to a sender allowing a participant to listen and to talk. Finally, a PRIVATE code is defined as a code that establishes a sub-session between a sender and one or more other designated stations(s).

An exemplary embodiment of the present invention has been described above. Those skilled in the art will understand, however, that changes and modifications may be made to this embodiment without departing from the true scope and spirit of the present invention, which is defined by the claims.

I claim:

1. A computing system for controlling scope of user participation during an ongoing real-time transport protocol (RTP) session in which a plurality of client stations communicate with each other through a central communication server, the system comprising:

the central communication server for receiving from one of the plurality of client stations, during the ongoing RTP session, a single predefined control code requesting a change in scope of user participation in the session, for referencing a table to determine an appropriate response to the received single predefined control code, and for updating access control rules in accordance with the response, wherein the access control rules govern a state of participation of each of the plurality of client stations, thereby controlling the scope of participation for each user communicating therefrom, and wherein the central communication server allows and disallows bridging communications between one or more of the plurality of client stations based on the updated access control rules; and the plurality of client stations in the session having the state of participation responsively changed while retaining participation of at least one client station in the session, wherein an indication of the changed state of participation for each of the plurality of client stations is maintained thereon, thereby affecting which choices for changing the state of participation of others in the plurality of client stations are available and displayed to a user, which, when selected, provide a predefined control code to the central communication server, wherein the plurality of client stations have unique identifiers, wherein the unique identifiers are selected from a group consisting of an IP address, a telephone number, and a SIP address based on a type of link that ties each of the plurality of client stations to the central communications server, and wherein each and every of the plurality of client stations is configured to provide, during the ongoing RTP session, over a single server link connected to at least one of the plurality of client stations, the predefined control code and one or more of the unique identifiers of the plurality of client stations together in a payload block of a packet, concurrently with a packetized encoded signal comprising a sequence of packets representing an underlying voice communication.

2. The system of claim 1, wherein the predefined control code comprises a MUTE control code.

3. The system of claim 2, wherein changing the state of participation of the plurality of client stations in the session comprises:
blocking communications from being sent, during the ongoing session, from a given client station to one or more other client stations of the plurality of client stations.

4. The system of claim 1, wherein the predefined control code comprises an UNMUTE control code.

5. The system of claim 4, wherein changing the state of participation of the plurality of client stations in the session comprises:
allowing communications to be sent, during the ongoing session, from a given client station to one or more other client stations of the plurality of client stations.

6. The system of claim 1, wherein the predefined control code comprises a BLOCK control code.

7. The system of claim 6, wherein changing the state of participation of the plurality of client stations in the session comprises:
blocking communications from being sent, during the ongoing session, to a given client station from one or more other client stations of the plurality of client stations.

8. The system of claim 1, wherein the predefined control code comprises a PRIVATE control code.

9. The system of claim 8, wherein changing the scope of participation of the one or more client station in the session comprises:
establishing a sub-session among a subset of the plurality of client stations.

10. The system of claim 9, wherein establishing a sub-session among a subset of the plurality of client stations comprises allowing communications between members of the subset, while blocking communications between (i) members of the subset and (ii) at least one other client station of the plurality of client stations.

11. The system of claim 9, wherein establishing a sub-session among a subset of the plurality of client stations comprises allowing communications between members of the subset, while blocking communications from (i) members of the subset to (ii) at least one other client station of the one or more client stations.

12. The system of claim 1, wherein receiving the predefined control code comprises receiving the predefined control code as a predefined parameter in an RTCP control packet sent from the plurality of client stations to the central server.

13. The system of claim 1, wherein receiving the predefined control code comprises receiving the predefined control code from a communication path comprising a wireless link.

14. A computing system for controlling scope of user participation during an ongoing conference session in which one or more client stations are bridged by a conference controller executable by a processor embodied on a server, the system comprising:
the conference controller for receiving, during the ongoing conference session, a single predefined control code requesting a change in scope of user participation, for referencing a table to determine an appropriate response to the received single predefined control code, for updating access control rules in accordance with the response,
wherein the conference controller is stored on the server,
wherein the access control rules indicate a state of participation of each of the one or more client stations that controls the scope of participation for each user communicating therefrom,
wherein an indication of the changed state of participation for each of the one or more client stations is maintained thereon, respectively,
wherein maintaining comprises:
(a) ascertaining which choices for changing the state of participation of another in the one or more client stations are available based on the state of participation of a subject client station;
(b) displaying the available choices to a user of the subject client station; and
(c) providing a predefined control code to the central communication server upon selection of at least one of the available choices,
wherein each and every one of the client stations is configured to provide the predefined control code and one or more unique identifiers of the others of the one or more client stations together in a payload block of a to the conference controller for responsively changing the scope of user participation, and
wherein the conference controller identifies the plurality of client stations by the one or more unique identifiers that comprise at least one of an IP address, a telephone number, or a SIP address.

15. The system of claim 14, wherein receiving the predefined control code comprises receiving the predefined control code via an out-of-band channel.

16. The system of claim 14, wherein receiving the predefined control code comprises receiving the predefined control code via an in-band channel.

17. The system of claim 14, wherein the one or more client stations are participating in the conference session, and wherein responsively changing the scope of user participation comprises:
establishing a sub-session among a subset of the one or more stations.

18. The system of claim 17, wherein establishing a sub-session among a subset of the one or more client stations comprises allowing communications between members of the subset, while blocking communications between (i) members of the subset and (ii) other members of the group.

19. The system of claim 17, wherein establishing a sub-session among a subset of the one or more client stations comprises allowing communications between members of the subset, while blocking communications from (i) members of the subset (ii) other members of the group.

20. A conference controller comprising:
a processor;
data storage; and
machine language instructions stored in the data storage and executable by the processor to carry out functions comprising:
detecting a single predefined control code transmitted to the conference controller,
wherein the conference controller is configured to receive the predefined control code from each and every of one or more client stations during an ongoing real-time transport protocol (RTP) conference session between the one or more client stations,
wherein each of the one or more client stations has a unique identifier wherein the unique identifier is selected from a group consisting of an IP address, a telephone number, and a SIP address based on a type of link that ties each of the one or more client stations to the central communications server, and wherein each of the one or more client stations is configured to convey, during the ongoing RTP conference session, over a single server link connected to the one or more client stations, the predefined control code and the unique identifier of the one or more client stations affected by the predefined control code together in a payload block of a packet, concurrently with a packetized encoded signal comprising a sequence of packets representing an underlying voice communication;

referencing a table to determine an appropriate response to the received single predefined control code, updating access control rules in accordance with the response, wherein the access control rules indicate a state of participation of each of the plurality of client stations that controls the scope of participation for each user communicating therefrom, and changing the scope of user participation in the ongoing conference session based on the updated access control rules.

21. The conference controller of claim 20, wherein changing the scope of user participation in the ongoing conference session comprises changing the scope of the participation of the one or more user stations in the ongoing conference session.

22. The conference controller of claim 21, wherein changing the scope of participation of the one or more user stations in the ongoing conference session comprises switching the one or more user stations to a listen-only mode of participation in the ongoing conference session.

23. A conference-server for bridging together communications between one or more client stations so as to establish conferences between the one or more client stations, the conference-server comprising:

a processor;

data storage; and a sub-conferencing routine stored in the data storage and executable by the processor to establish a sub-conference between a subset of the one or more client stations currently engaged in a conference, wherein the sub-conferencing routine is executable to achieve the following:

(1) accept a single predefined control signal from the processor, wherein the processor is configured to receive the single predefined control signal from each and every of the one or more client stations, wherein each of the one or more client stations is configured to convey, during the ongoing conference, over a single server link connected to the one or more client stations, the predefined control code and the unique identifier of the one or more client stations affected by the predefined control code together in a payload block of a packet, concurrently with a packetized encoded signal comprising a sequence of packets representing an underlying voice communication;

(2) reference a table to determine an appropriate response to the received single predefined control signal;

(3) update access control rules in accordance with the response, wherein the access control rules indicate a state of participation of each of the one or more client stations, thereby controlling the scope of participation for each user communicating therefrom;

(4) maintain an indication of the state of participation for the one or more client stations, wherein maintaining comprises:

(a) ascertaining which choices for changing the state of participation of others in the one or more client stations are available based on the state of participation for each of the one or more client stations;

(b) displaying the available choices to a user of the one or more client stations; and (c) providing a single predefined control code to a central communication server upon selection of at least one of the available choices; and (5) establish the sub-conference in response to a single predefined control signal, wherein the one or more client stations have unique identifiers wherein the unique identifiers are selected from a group consisting of an IP address, a telephone number, and a SIP address based on a type of link that ties each of the one or more client stations to the central communications server.

24. The conference-server of claim 23, further comprising: a restoring routine stored in the data storage and executable by the processor, after establishing the sub-conference, to end the sub-conference and restore the conference.

25. The conference-server of claim 24, wherein the restoring routine is executable to restore the conference in response to a predefined control signal received by the conference-server during the sub-conference.

* * * * *

UNITED STATES PATENT AND TRADEMARK OFFICE
CERTIFICATE OF CORRECTION

PATENT NO. : 7,636,750 B2  Page 1 of 1
APPLICATION NO. : 10/000855
DATED : December 22, 2009
INVENTOR(S) : Debashis Haldar It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1274 days.

Signed and Sealed this

Ninth Day of November, 2010

David J. Kappos
*Director of the United States Patent and Trademark Office*